United States Patent [19]

Schweitzer, III

[11] Patent Number: 5,325,061

[45] Date of Patent: Jun. 28, 1994

[54] COMPUTATIONALLY-EFFICIENT DISTANCE RELAY FOR POWER TRANSMISSION LINES

[75] Inventor: Edmund O. Schweitzer, III, Pullman, Wash.

[73] Assignee: Schweitzer Engineering Laboratories, Inc., Pullman, Wash.

[21] Appl. No.: 936,255

[22] Filed: Aug. 27, 1992

[51] Int. Cl.$^5$ .................. G01R 31/08; H02H 3/26
[52] U.S. Cl. .................. 324/522; 324/521; 324/524; 361/80
[58] Field of Search ........... 324/418, 512, 521, 522, 324/524, 525, 537, 543; 361/80, 81, 82, 84, 79, 76

[56] References Cited

U.S. PATENT DOCUMENTS

| | | | |
|---|---|---|---|
| 3,340,434 | 9/1967 | Riebs | 361/80 |
| 4,148,087 | 4/1979 | Phadke | 361/80 |
| 4,251,766 | 2/1981 | Souillard | 324/521 |
| 4,329,727 | 5/1982 | Premerlani | 361/80 |
| 4,433,353 | 2/1984 | Wilkinson | 361/80 |
| 4,906,937 | 3/1990 | Wikström et al. | 324/522 |
| 5,140,492 | 8/1992 | Schweitzer, III | 361/80 |

*Primary Examiner*—Gerard R. Strecker
*Assistant Examiner*—Diep Do
*Attorney, Agent, or Firm*—Jensen & Puntigam

[57] ABSTRACT

The relay includes means for obtaining current and voltage samples on the power transmission line for a particular possible fault type. The current sample is multiplied by the replica impedance of the power transmission line, while the voltage sample is multiplied by a polarizing voltage to provide a first complex expression having a real portion and an imaginary portion. The product of the current sample and the replica impedance is multiplied by the polarizing voltage to produce a second complex expression having a real portion and an imaginary portion. The real portion of the first complex expression is then divided by the real portion of the second complex expression to produce a scale value m which is compared against known reference scale values for each zone, so as to determine underimpedance conditions in any one of the zones.

9 Claims, 2 Drawing Sheets

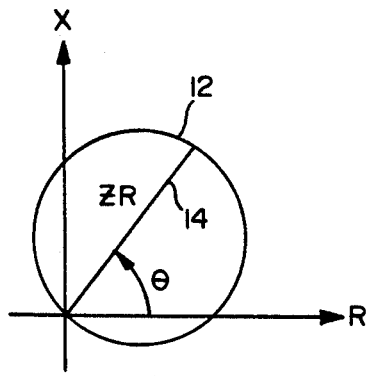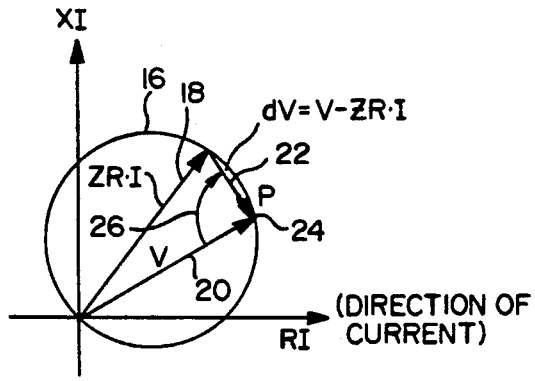
FIG. 1    FIG. 2
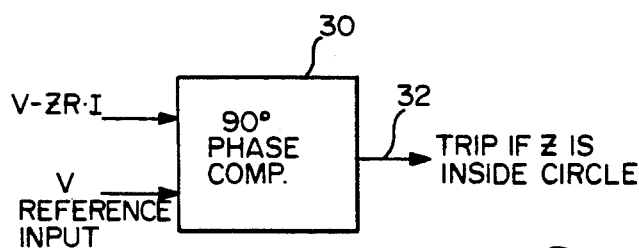
FIG. 3
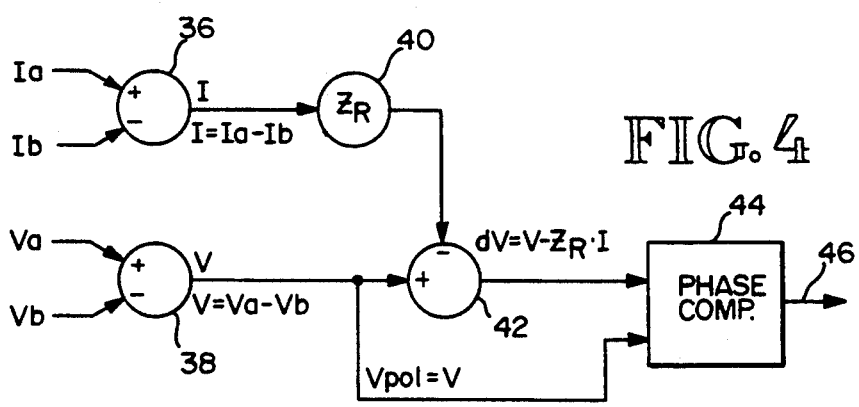
FIG. 4

COMPUTATIONALLY-EFFICIENT DISTANCE RELAY FOR POWER TRANSMISSION LINES

TECHNICAL FIELD

This invention relates generally to the field of protective relays for power transmission lines and more particularly concerns a distance relay covering multiple zones on a transmission line.

BACKGROUND OF THE INVENTION

Distance relays are used primarily to detect underimpedance conditions on a power transmission line, due to a fault or other condition on the line, although they may be used in other applications as well. One particular type of distance relay is known as the "mho" relay. The mho relay has a circular impedance plane characteristic and in operation, discriminates between transmission line impedances which are inside or outside of the mho circle. An actual impedance for a particular line portion which is determined by the relay to be inside the mho circle is an indication of an underimpedance condition on that particular portion of the line, which in turn is a reliable indication that there is a fault on that portion of the line.

While the mho circle distance relay is reliable and has been widely used for several decades, a large number of individual mho elements are required to cover all of the fault types in a three phase line. When four or even more zones along a given portion of transmission line are covered by a conventional distance relay, twenty-four or even more mho elements may be necessary. Associated computation/comparison elements and computation time are necessary for the operation of each mho element, to calculate the impedance condition. Thus, for a distance relay covering a number of overlapping zones, including all fault types, a large number of elements is required and the overall system is computationally intensive.

From the standpoint of system cost, as well as reliability and efficiency, it would be desirable to reduce the number of mho elements and the computational burden in such a relay without decreasing the protective capability of the relay.

DISCLOSURE OF THE INVENTION

Accordingly, the invention is a distance relay for multiple zone coverage of power transmission lines, where the power transmission line has a replica impedance. The distance relay includes means for measuring the voltage on the transmission line for a particular possible fault type and means for measuring the current on the transmission line for said fault type; means for multiplying the measured current by the replica impedance of the transmission line to produce a voltage product; means for producing a polarizing reference voltage and for multiplying the voltage product by the polarizing reference voltage to produce at least the real portion of an otherwise complex expression; means for multiplying the measured voltage by the polarizing reference voltage to produce at least the real portion of an otherwise second complex expression; means for dividing the real portion of the otherwise second complex expression by the real portion of the otherwise first complex expression to produce an actual value of m, means for establishing reference values of m for at least one zone of the transmission line; means comparing the actual value of m with the reference value of m; and means for producing an output indication when the actual value is other than the reference value.

As an alternative, a reference current could be used instead of a reference voltage.

BRIEF DESCRIPTION OF THE DRAWINGS

FIG. 1 is a diagram of a mho circle relay characteristic in the impedance plane.

FIG. 2 is a diagram of a mho relay characteristic in the voltage plane.

FIG. 3 is a simplified diagram showing one method for determining whether the line impedance is inside or outside the mho characteristic circle.

FIG. 4 is a diagram of distance relay architecture used in the prior art, covering one zone.

BEST MODE FOR CARRYING OUT THE INVENTION

Figure 5:
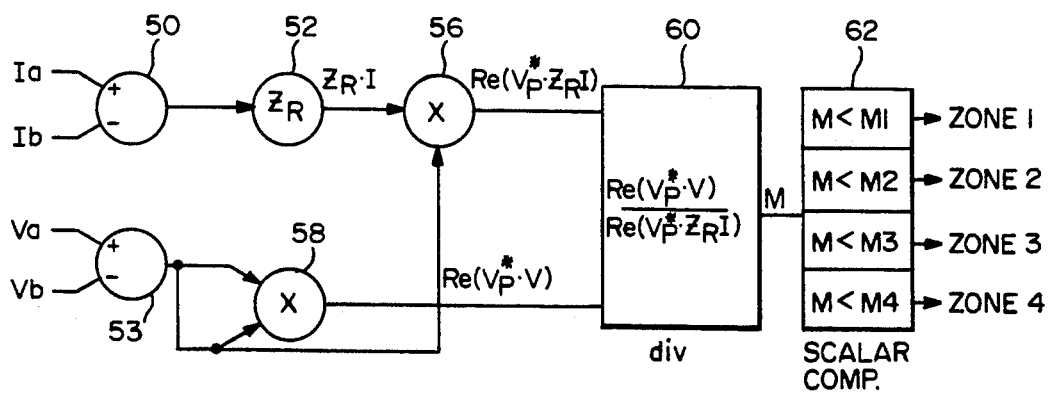
FIG. 5 is a diagram of the distance relay architecture of the present invention, covering four zones.

FIG. 1, as briefly discussed above, shows a conventional mho element characteristic in the impedance plane. Conventional distance relays use a large number of such mho elements to determine underimpedance conditions on power transmission lines. The mho circle is shown at 12; the impedance line referred to as ZR (at angle $\theta$), shown at 14, defines the "reach" of the relay characteristic. ZR is the impedance for a particular portion of the transmission line, and is generally referred to as the relay or replica impedance.

FIG. 2 shows a mho element characteristic in the voltage plane. The mho circle is shown generally at 16. The voltage phasor 18 is the product of the relay impedance ZR and the measured current I on the transmission line, while voltage phasor 20 is the measured voltage on the transmission line. Phasor 18 is the diameter of the mho circle, since it extends through the center of the circle. Voltage phasor 22 is the difference between voltage phasor 20 and voltage phasor 18, expressed as follows: dV=V-ZR I. The three quantities dV, V and ZR I form a triangle as shown in FIG. 2. Voltage phasor 20 terminates on the mho circle at a point 24. For a fault at an impedance ZR from the relay, angle 26 between V and dV is 90°, since phasor 20 is the side opposite from phasor 18 which is the diameter of the mho circle.

The actual impedance at point 24 is V (measured) over I (measured). If the actual impedance is smaller than ZR, indicative of an underimpedance condition, and hence indicative of a fault on the line, angle 26 is no longer 90° but is rather greater than 90°. Overimpedance conditions on the line result in the angle 26 being less than 90°. Underimpedance conditions on transmission lines are detected using mho elements by determining the angle between the two phasors dV and V for the portion of the transmission line serviced by the relay. Referring now to FIG. 3, this is done conventionally in several ways, including applying the two phasors as inputs to a 90° phase comparator 30. The output from the phase comparator 30 appears on output line 32.

Typically, if the angle is determined by phase comparator 30 to be greater than 90°, indicating an underimpedance condition, there will be a corresponding output signal, on line 32 in FIG. 3, for example, which then is used to close a contact or set a bit which in turn results in a circuit breaker tripping in the protection system for that part of the transmission line. Different phase comparators have been used, including induction cylinder units, Hall Effect devices, coincidence timing circuits, as well as mathematical calculations performed in the newer computer based distance relays.

A conventional distance relay typically covers phase-to-ground, phase-to-phase and three phase faults for a three phase transmission line, covering each of several zones of coverage along the line, i.e. AG, BG, CG, AB, BC and CA for each zone. FIG. 4, for example, shows a conventional distance relay architecture for a single zone, phase A to B (AB) coverage. Current and voltage difference values for the phase A and phase B lines (Ia-Ib and Va-Vb) are produced by difference elements 36 and 38. The resulting current I is applied to a multiplier element 40, which multiplies the value of current I by the relay impedance ZR. This first resulting voltage value from multiplier 40 is applied as one input to a difference element 42. A second resulting voltage value from difference element 38 is applied as the other input to difference element 42. The output of difference element 42, which is V−ZR I, i.e. dV, is applied as one input to a phase comparator 44. The other input to the phase comparator is a polarizing or reference voltage, in this case V (from difference element 38)

In the FIG. 4 configuration, the mho relay element is "self-polarized", which means that the voltage V in FIG. 4 applied to element 42 to determine the difference voltage dV is also used as the reference (polarizing) input voltage to phase comparator 44. However, in many situations, particularly if a fault happens to be close to the origin, V may be close to 0, which will not provide acceptable results. To overcome this problem, a polarizing voltage, referred to generally as $V_P$, is produced. There are a number of different techniques for producing such a polarizing voltage. As one example, an AG (phase A to ground) mho element could have a polarizing or reference voltage of VA with a pre-fault memory, or a positive sequence voltage referenced to VA. The positive voltage could be filtered to provide a memory capability. In any event the reference voltage input to the phase comparator 44 will typically be a polarizing voltage $V_p$ which is other than the actual voltage V measured on the line.

As discussed above, phase comparator 44 will operate to provide an output indication on line 46 if the angle between the voltage phasors V and dV is greater than 90°, thus indicating that there exists a fault on the line (V is inside the mho circle). The circuit of FIG. 4, which is for a single zone, phase AB to phase B (AB) fault type coverage, can be replicated in parallel for all the other phase and zone coverages. Zone 1 will typically cover the portion of the transmission line in front of the relay but not past the next bus down the line. Zone 2 will usually cover the rest of the line to the next bus and the next bus, while Zone 3 will cover the next bus and the next successive one. Timers are used for coordination between the three zones. Zone 4 coverage might be reversed, such as for bus back-up. A complete distance relay may thus include 24 or more mho elements, with a corresponding number of comparators. Also an element for computing ZRI is necessary for each mho element.

The purpose of the present invention is to significantly reduce the computational elements necessary for a distance relay covering all phase and zone determinations. This is accomplished by a system which requires a single calculation for each phase combination, the single calculation being used for as many zones as desired for that one phase combination.

In the present invention, $V_P=$ the polarizing voltage at the particular relay element, I=the current on the line at the relay, V=the voltage on the line at the relay for the given calculation and ZR=the replica impedance setting of the relay, which could be the impedance for zone 1 or the entire line. A scaler quantity m is now defined as the coverage or reach of the relay in multiples of ZR, i.e. 1,2,3, etc for multiples or fractions of ZR. The difference voltage phasor dV for a particular mho element will thus be $dV=V_P-mZR\ I$. In testing the angle of phasor dV relative to the angle of phasor $V_p$, the expression $Re(dV\ V_p^*)$ is zero when the angle between the two phasors is 90° (V is on the mho circle). "Re" refers to the "real" part of a complex number while $V_p^*$ refers to the complex conjugant of a complex expression. In the above equation, substituting for dV results in the following: $Re[(V-mZR\ I)\ V_p^*]=0$. Expanding that expression will produce the following: $Re(V\ V_p^*)-Re(mZR\ I\ V_p^*)=0$. Solving now for m: $m=Re(V\ V_p^*)/Re(ZR\ I\ V_p^*)$.

The expression for m, properly interpreted, provides first a reliable indication of the direction of the fault, i.e. in front of the relay or in back of the relay, as well as an indication of an underimpedance condition, in any selected zone. Specifically, the denominator part of the above expression, i.e. $Re(ZR\ I\ V_p^*)$, is directional, i.e. it is positive for faults which are in front of the relay and negative for reverse direction faults. The value of m is compared against established thresholds for the various zones being covered. Assume for example for a forward fault, that ZR is the impedance of the portion of line from the relay to the next bus and that zone 1 has been selected to cover 90% of that line portion. In that case, if the value of m is less than 0.9, there is an underimpedance condition within zone 1. For a zone 2 test, which might cover, for example 130% of the ZR line portion, with voltage and current values from zone 2, if m is determined to be less than 1.3, then an underimpedance condition exists in zone 2. This same approach can be used for the remaining zones, as long as the relationship between the line impedance ZR and the zone coverage impedance is known, and voltage and current values for each zone are obtained.

On the other hand, if the fault is a reverse fault, i.e. behind the relay, which is determined by the sign of the denominator, m is then checked against negative thresholds. For example, if a reverse zone reaches to the rear of the relay for 300% of the ZR line portion, an m greater than −3 indicates an underimpedance condition.

The above-identified description is based on mho, i.e. impedance characteristics. A similar approach can be used with reactance characteristics, except that the polarizing voltage $V_P$ is replaced by a polarizing current $I_p$. The polarizing reference current could be derived from the residual current of $I_A+I_B+I_C$, or could be produced from negative sequence current, or in other ways.

A basic implementation of the computationally efficient relay discussed above is shown in FIG. 5, for a four zone, self-polarized relay for an AB (phase A to phase B) fault type measurement. For other possible fault types, other corresponding voltages and currents are measured. The current values Ia, Ib from the phase A and phase B lines are applied, respectively, to difference element 50. The difference output is applied to a multiplier unit 52 which multiplies the difference current by the line impedance ZR. This resulting first voltage product is applied as one input to a multiplier 56. The voltage values Va, Vb are applied to voltage difference element 53, the difference output being applied to a multiplier element 58 to which is also applied a polarizing voltage $V_p$. The output of multiplier element 58 will be $Re(V \cdot V_p^*)$. Polarizing voltage $V_p$ is also applied to multiplier 56, which produces an output $Re(V_p \cdot Z_R \cdot I)$. In addition to this output being used to calculate m, as discussed below, it also indicates the direction of the fault. Only the real portions of the otherwise complex expressions are actually calculated in order to minimize computation burden, since only the real portions are necessary.

The outputs from multiplier 56 and element 58, respectively, are applied to a divider 60, with the output of the divider being m, a numerical value. This output is then applied to a scaler comparator 62 which has established reference numerical values for m for each particular zone to be determined. The actual m value is compared against the selected reference scale value for the particular zone of interest. If the actual m value is less than the reference scale m value for the zone of interest, then an underimpedance condition for that zone is indicated. The resulting output signal can then used to set a bit or produce a contact closure which will result in a tripping of the circuit breaker, interrupting the transmission line.

The above-identified arrangement using the scaler value m and the scaler comparator 62 eliminates the plurality of phase comparators in such relays, and reduces significantly the number of ZR·I computations required. The actual computational burden of the above-described invention is approximately half that of a conventional system, which is a significant savings.

Although a preferred embodiment of the invention has been disclosed herein for illustration, it should be understood that various changes, modifications and substitutions may be incorporated in such embodiment without departing from the spirit of the invention which is defined by the claims which follow:

What is claimed is:

1. A distance relay for multiple zone coverage of power transmission lines, the transmission line having a replica impedance, the distance relay comprising:
   means for determining a power signal current value for a particular possible fault type on the transmission line;
   means for determining a power signal voltage value for said particular possible fault type;
   means for multiplying the current value by the replica impedance of the transmission line to produce a voltage product;
   means for producing a polarizing reference voltage and for multiplying the voltage product by the polarizing reference voltage to produce at least the real portion of an otherwise first complex product;
   means for multiplying the voltage value by the polarizing reference voltage to produce at least the real portion of an otherwise second complex product;
   means for dividing the real portion produced by multiplying the voltage value and the reference voltage by the real portion produced by multiplying the voltage product and the reference voltage to produce an actual scale value m;
   means establishing reference scale values of m for at least one zone of the transmission line;
   means for comparing the actual scale value with the reference scale value for a selected zone; and
   means producing an output indication when the actual scale value is less than the reference scale value, which is indicative of an underimpedance condition on the transmission line.

2. An apparatus of claim 1, wherein there are at least three zones of coverage for the transmission line provided by the distance relay.

3. An apparatus of claim 1, wherein the polarizing voltage is produced from a positive sequence voltage.

4. An apparatus of claim 3, including means for filtering the positive sequence voltage so as to provide a memory capability therefor.

5. An apparatus of claim 1, wherein the voltage product multiplying means, and the voltage value multiplying means, and the dividing means include means for performing mathematical calculations.

6. A distance relay for multiple zone coverage of power transmission lines, wherein the power transmission line has a replica impedance, comprising:
   means for determining a power signal current value for a particular possible fault type on the transmission line;
   means for determining a power signal voltage value for said particular possible fault type;
   means for multiplying the current value by the replica impedance to produce a voltage product;
   means for producing a polarizing reference current and for multiplying the voltage product by the reference current to produce at least a portion of an otherwise first complex product;
   means for multiplying the measured voltage by the reference current to produce at least a portion of an otherwise second complex product;
   means for dividing the portion produced by multiplying the voltage product and the reference current by the portion produced by multiplying the voltage value and the reference current to produce an actual scale value m;
   means for establishing reference scale values of m for at least one of the zones of the transmission line;
   means for comparing the actual scale value with the reference scale value for a selected zone; and
   means producing an output indication when the actual scale value is less than the reference scale value, which is indicative of an underimpedance condition on the transmission line.

7. An apparatus of claim 6, wherein there are at least three zones of coverage for the transmission line provided by the distance relay.

8. An apparatus of claim 6, wherein the polarizing reference current is produced from residual current of $Ia + Ib + Ic$.

9. An apparatus of claim 6, wherein the polarizing reference current is produced from negative sequence current.

* * * * *